United States Patent [19]
Etter

[11] 3,848,176
[45] Nov. 12, 1974

[54] CONTROL CIRCUIT FOR AN INVERTER WITH A VARIABLE OUTPUT VOLTAGE AND FREQUENCY

[76] Inventor: Marcel Etter, 3 bis, chemin des Pontets, Geneva, Switzerland

[22] Filed: Mar. 26, 1973

[21] Appl. No.: 344,528

[30] Foreign Application Priority Data
Mar. 30, 1972 Switzerland.......................... 4794/72

[52] U.S. Cl........................................ 321/18, 321/5
[51] Int. Cl. ........................................... H02m 7/52
[58] Field of Search................... 321/5, 18, 45, 45 C

[56] References Cited
UNITED STATES PATENTS

| | | | |
|---|---|---|---|
| 3,327,199 | 6/1967 | Gardner et al..................... | 321/18 X |
| 3,403,318 | 9/1968 | Krauthamer et al.............. | 321/21 X |
| 3,453,524 | 7/1969 | Dinger..................................... | 321/5 |
| 3,500,168 | 3/1970 | Merritt.................................... | 321/18 |
| 3,611,108 | 10/1971 | Susumu et al. ..................... | 321/5 X |
| 3,694,730 | 9/1972 | Hoft et al............................... | 321/21 |
| 3,737,755 | 6/1973 | Calkin et al. ...................... | 321/21 X |

*Primary Examiner*—William M. Shoop
*Attorney, Agent, or Firm*—Emory L. Groff; Emory L. Groff, Jr.

[57] ABSTRACT

An inverter with a variable output voltage and frequency, intended to supply an a.c. motor or a similar load, in which the variation of amplitude of the output voltage is provided by a chopper supplying the inverter with pulses of variable width or by switching of the inverter itself, is controlled by an electronic circuit in which the voltage supplied by the chopper or the rectified output voltage of the inverter is integrated to give an image of the instantaneous variation of the flux induced in the motor. The output voltage of the inverter is cancelled or reduced each time that the integrated signal reaches a maximum value corresponding to a desired variation of said flux, and the integrated signal is then set to zero. The chopper or the inverter is periodically reset to the minimal switching frequency of the inverter to obtain the desired output frequency or to a whole number multiple of said minimal frequency, means being provided for automatically modifying said multiple when the frequency of the chopper or of the inverter is too small or too large and for making the maximum value of the integrated signal correspond to a variation of flux equal to that obtained at said minimal frequency divided by the said chosen multiple.

8 Claims, 4 Drawing Figures a) U b) U-V (n=2)

c) f

CONTROL CIRCUIT FOR AN INVERTER WITH A VARIABLE OUTPUT VOLTAGE AND FREQUENCY

The invention relates to inverters having a variable output voltage and frequency.

The positive and negative alternances of the output voltages of an inverter, supplying an a.c. motor for example, must be symmetrical otherwise undesirable torques are produced in the motor which is not only braked, but often oscillates about its mean speed. This is the case when the variation of the amplitude of the a.c. output voltage of the inverter is obtained by variation of the d.c. input voltage by means of a chopper. In effect, since the chopper operates at its natural frequency, it produces beats with the phase-switching frequency of the inverter, which is equal to six times the output frequency in the case of a three-phase inverter having a block-wave output voltage. There is consequently an asymmetry between the positive and negative alternations of the output voltages, and this asymmetry varies slowly with the ratio between the frequency of the chopper and that of the inverter, which produces an oscillation of the speed of the motor.

To avoid these beats without relying on the expensive alternative of filtering the variable d.c. voltage by means of capacitors and inductors, it is necessary to synchronize the switching frequency of the chopper with that of the inverter, and also to control the duration of the chopper pulses to make each half-alternance of the inverter output identical to the subsequent one, whatever be the output frequency of the inverter.

In the case where an inductor for filtering the chopper current is not essential and limitation of the output voltage of the inverter is obtained by high frequency switching of the inverter, the generator thus being directly supplied by a high voltage d.c. source, the same problem of beats appears and can be solved in the same manner by synchronizing the switching frequency of the inverter with a harmonic of the minimum frequency which sets the output frequency of the inverter.

The invention concerns a control circuit for an inverter with a variable output voltage and frequency, intended to supply an a.c. motor or a similar load, in which the variation of amplitude of the output voltage is provided by a chopper supplying the inverter with pulses of variable width or by switching of the inverter itself, characterized in that the voltage supplied by the chopper or the rectified output voltage of the inverter is integrated in a manner to give an image of the instantaneous variation of the flux induced in the motor, the output voltage of the inverter being cancelled or reduced each time that the integrated signal reaches a maximum value corresponding to a desired variation of said flux, the integrated signal being then set to zero, the chopper or the inverter being periodically reset to the minimal switching frequency of the inverter to obtain the desired output frequency or to a whole number multiple of said minimal frequency, means being provided for automatically modifying said multiple when the frequency of the chopper or of the inverter is too small or too large and for making the maximum value of the integrated signal correspond to a variation of flux equal to that obtained at said minimal frequency divided by the said chosen multiple.

An embodiment of the invention is shown, by way of example, in the accompanying drawings, in which.

Figure 1:
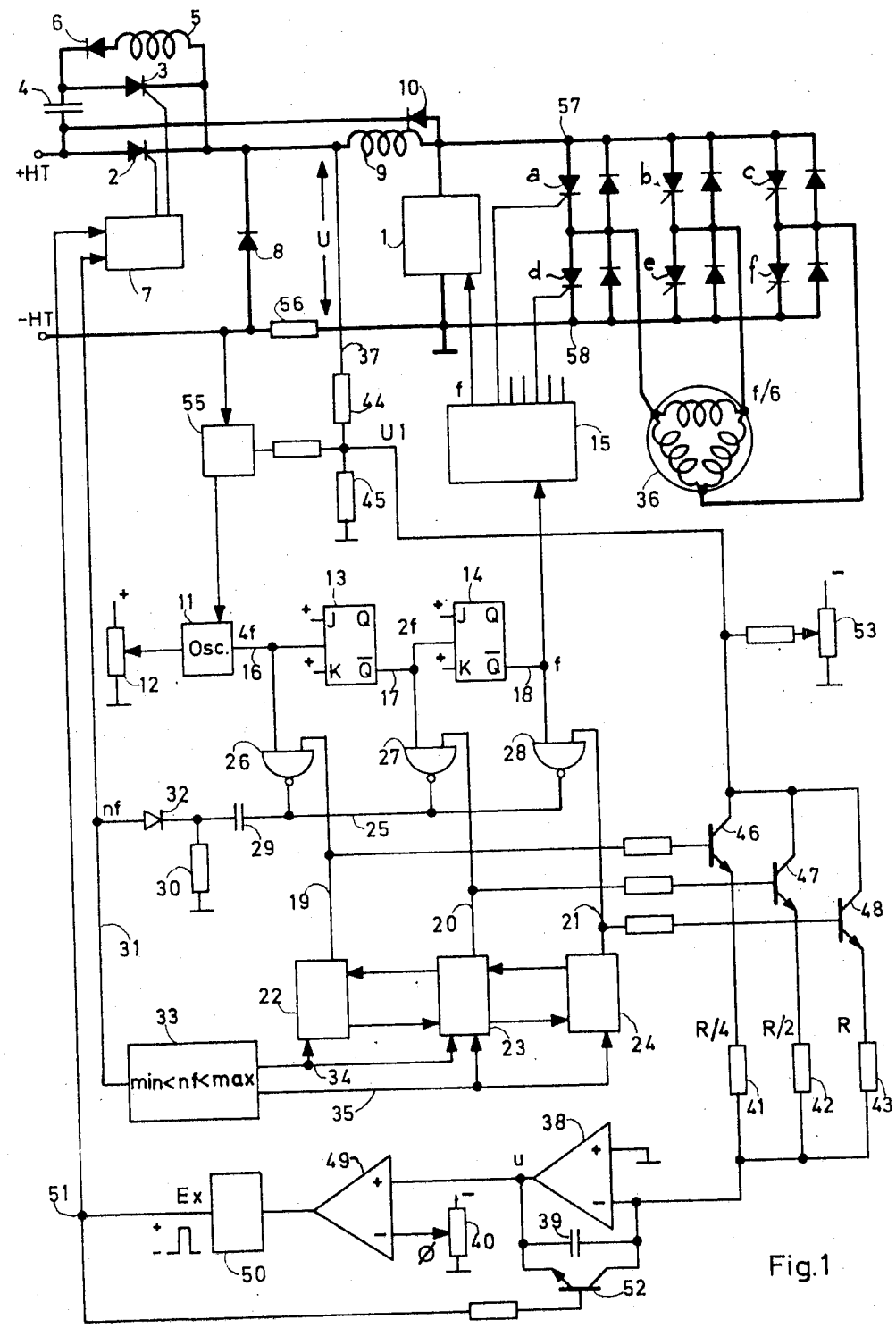
FIG. 1 is a circuit diagram of a three-phase inverter supplied by a chopper, together with an electronic control circuit according to the invention.

The inverter of FIG. 1 may be of any known type, for example that described in U.S. Pat. No. 3,321,697 and comprises a single quenching circuit 1 for thyristors $a$ through $f$. The chopper includes a main thyristor 2, a thyristor 3 adapted to switch off thyristor 2 by means of a capacitor 4 previously charged via an inductance coil 5 and a diode 6 when the thyristor 2 is switched on. Switching on of thyristors 2 and 3 is carried out by a circuit 7, which is controlled by said control circuit. The chopper also includes a diode 8 for the passage of current supplied to the inverter during blocking of the thyristor 2, a smoothing inductance 9, and a diode 10 for limiting the voltage across the inverter bridge.

The control circuit includes an oscillator 11 whose frequency is a multiple (in this example by 4) of the output frequency $f$ of the inverter, and is varied by means of a potentiometer 12. The frequency of oscillator 11 is divided by two at the output of a first flip-flop 13, and by four at the output of a second flip-flop 14. The frequency $f$ of the block-wave output signals from flip-flop 14 is used to control the inverter via a circuit 15 which on the one hand causes the quenching circuit 1 of the inverter to operate at a frequency $f$ and, on the other hand, permutes the signals for switching on the thyristors $a$ through $f$ of the inverter bridge in a manner to provide a three-phase output voltage at a frequency $f/6$.

The pulses at the output 16 of oscillator 11 thus have a frequency $4f$ in this example, and the pulses of output 17 of flip-flop 13 have a frequency of $2f$.

The frequency of switching on and off of the chopper is fixed by that of trigger circuits 22, 23 and 24 which each supply a positive signal to their output 19, 20 and 21 respectively. This is achieved by means of gates 26, 27 and 28 each including one input connected to a respective output 19, 20 and 21, and a second input connected to outputs 16, 17 and 18 at frequencies $4f$, $2f$ and $f$ respectively. Said gates supply output signals on the common line 26 at a frequency $4f$, $2f$ and $f$ respectively, when the outputs 19, 20 and 21 supply positive signals. The voltage applied to line 25 in this manner at frequency $nf$ is derived by a capacitor 29 and a resistor 30, and the negative pulses provided are transmitted by a diode 32 to a line 31. These negative pulses on the one hand switch on the thyristor 2 of the chopper and, on the other hand, are fed into a circuit 33 controlling the frequency $nf$ of the chopper.

The control circuit 33 includes first level detection means indicating when the frequency $nf$ is too high, and a generator supplying, in this eventuality, a pulse to a conductor 34 at its output, and second level detection means indicating when the frequency $nf$ is too low, and a generator supplying in this case a pulse at output 35. A too-high frequency may produce excessive losses in the chopper, and a too-low frequency may produce an excessive rippling of the current in the inductance coil 9 and consequently in the motor. If the output 19 is positive, the pulse on conductor 34 energizes a flip-flop switch 22 which when it is energized sends a pulse to flip-flop switch 23 in a manner to place it in turn into a state in which it supplies a positive voltage at output 20. If, to the contrary, when a pulse is delivered to the conductor 34, the flip-flop switch circuit 23 supplies a positive voltage to its output 20, this switch returns to its rest position and the flip-flop switch circuit 24 is placed in the operative state in which it supplies a positive voltage to the output 21. In both cases, the frequency $nf$ of the choppers is divided by two after delivery of a pulse to the conductor 34.

In the same manner, but in the opposite direction, a pulse on the output 35 of frequency control circuit 33 causes transfer of the positive signal of output 21 to output 20, or from output 20 to output 19, the effect of which is to double the operating frequency $nf$ of the chopper in relation to the switching frequency $f$ of the inverter.

It is thus during variation of the speed of the motor by displacement of the sliding contact of reference potentiometer 12 that the frequency of the chopper varies, and it is necessary to abruptly increase of reduce this frequency when it departs from the limiting range ensuring a satisfactory operation of the chopper.

Supply of motor 36 with a substantially constant flux is obtained by simulating the flux by measurement of the integral $$\int_0^\pi$$

edt of the voltage at its terminals, and by rendering this integral constant, or more exactly, in order to simplify, by carrying out the integral $$\int_0^{\pi/3}$$

Udt (with reference to the output frequency $f/6$ of the inverter) of the voltage U supplied by the chopper to the inverter, for example at the input of inductance coil 9. This voltage U is taken, by a line 37, between each switching of the inverter, which in fact gives an image of half the flux induced in the motor. In effect, the voltage between phases of the inverter is zero during one period of switching of the inverter then alternately positive or negative during the two following periods (see FIG. 4b).

The entire variation $\Delta\Phi$ of the flux in one phase of the delta-connected motor 36 takes place during two switching periods, the variation of flux between each switching being thus equal to $\Delta\Phi/2$. Now, while it is easy to choose once and for all the amplitude of the integral $$\int_0^{\pi/3}$$

Udt giving the desired flux in the motor when the frequency of the chopper is equal to the switching frequency of the inverter, i.e., for high inverter frequencies, and to block the thyristor 2, which is conducting after each switching for example, as soon as the integral reaches the chosen amplitude, it is no longer possible, without modification, to employ the same integrator circuit when the chopper frequency is doubled, since in this case the flux in the motor would also be doubled, or would at least reach saturation.

Consequently, since the variation of the induced flux in one phase of the motor between two switch-overs of the inverter is equal to $\Delta\Phi/2$, the integral $$\int_0^{\pi/3}$$

Udt of the voltage supplied upon each pulse of the chopper must produce a flux variation of $\Delta\Phi/2n$, so that the n pulses between two switch-overs of the inverter produce a total flux variation of $\Delta\Phi/2$.

In the integrator of FIG. 1 composed of an amplifier 38, a capacitor 39 and supplied by a current proportional to the voltage U, it is possible to vary either (a) the capacitor 39, (b) the level of triggering the integrator by means of a sliding contact of a potentiometer 40, or (c), as a function of the number $n$, the input current of the integrator in a manner to set it to zero each time that the flux in the motor has varied by $\Delta\Phi/2n$. In the described example, the triggering level is fixed by means of the potentiometer 40. This level sets the flux in motor 36 at a constant value and the integration current is varied in proportion to n by means of resistors 41, 42, 43 equal to $R/n$ and connected to potential $U_1$ by transistors 46, 47, and 48 which are respectively connected to outputs 19, 20 and 21 and are made to conduct when the respective output is positive. This positive signal is of course at a greater positive value than the potential $U_1$, so that the transistor 46, 47 or 48 saturates. A voltage divider 44, 45, dividing the signal $U_1$ from the high voltage U, is of low impedance compared to resistor 41, so that the connexion of resistors $R/n$ does not modify the signal $U_1$.

Hence, as soon as the integration signal $u$ leaving the amplifier 38 exceeds the negative voltage supplied by potentiometer 40, the amplifier or comparator 49 trips causing the triggering of a pulse to an output 51 of a pulse generator 50; this pulse is employed on the one hand to control blocking of the principal thyristor 2 of the chopper via circuit 7 and, on the other hand, to discharge the capacitor 39 of the integrator through transistor 52.

The voltage supplied by potentiometer 53 slightly modifies the potential $U_1$ in a manner to increase the voltage supplied to motor 36 upon starting and consequently increase the torque at very low frequencies. The circuit 55, sensitive to the load of the motor, slightly modifies the voltage $U_1$ in a manner to reduce the voltage supplied to the motor when the motor tends to saturate, saturation being detected by the increase in the amplitude of the reverse current returning to the d.c. source after each switch-over of the inverter. The amplitude of the reverse current is measured across the terminals of a resistor 56. It is moreover advantageous to employ variations of the same d.c. signal resulting from detection of the amplitude of the reverse current to cause a momentaneous variation of the frequency or, which amounts to the same, a variation of the phase of the pulses of oscillator 11 so as to stabilize the motor when it tends to oscillate, the phase being advanced when the amplitude of the reverse current increases.

Figure 2:
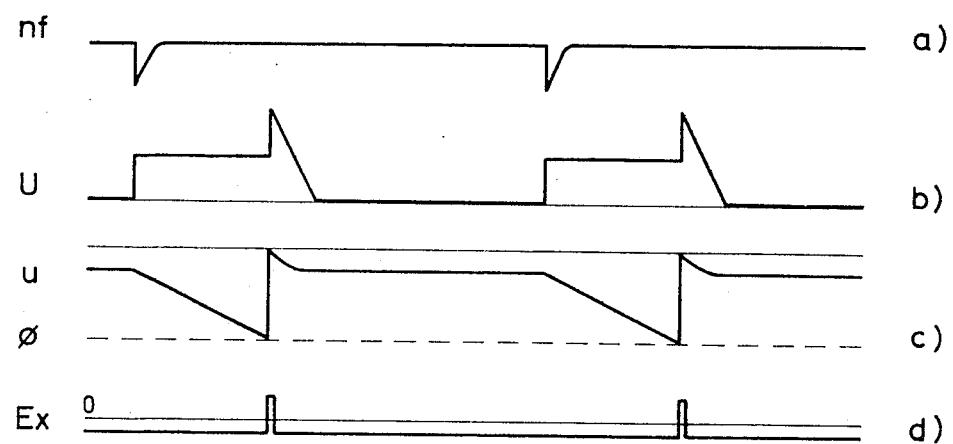
FIG. 2 illustrates typical wave-forms of signals of the circuit of FIG. 1.

FIG. 2 shows, at (a), the pulses $nf$ on line 31 for controlling switching on of the chopper; at (b), a typical form of the voltage U at the output of the chopper before inductance coil 9; at (c), the result of integration of the current proportional to voltage U; and at (d), the pulse Ex supplied by generator 50 for cutting off the chopper and discharging capacitor 39 of the integrator, this pulse appearing at the moment when the voltage U of the integrator reaches the reference value Φ fixing the flux in the motor, and given by the potentiometer 40.

Figure 3:
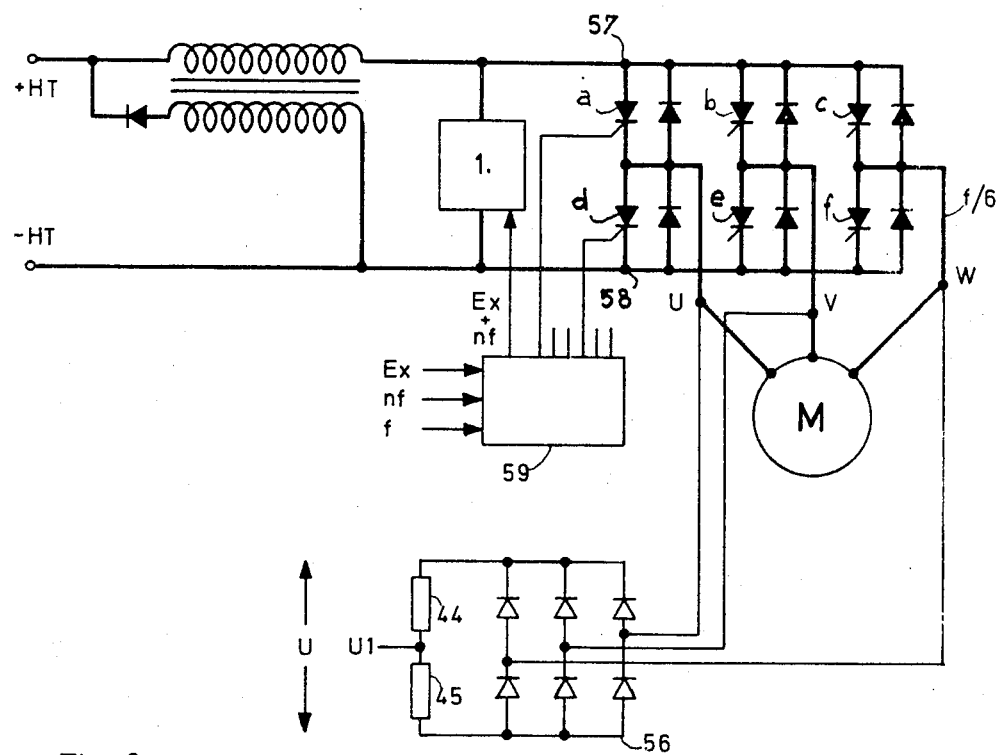
FIG. 3 shows a modified control circuit for the control of an inverter without a chopper.

FIG. 3 shows a variation enabling the provision of a signal U equivalent to the measurement of the voltage U of the chopper of FIG. 1, in the case of an inverter in which the chopper function is carried out by its own phase switching units. For this purpose, a three-phase signal U, V, W is rectified by a diode bridge 56 and reproduces a signal U equivalent to that which appears between the d.c. terminals 57 and 58 of the inverter bridge of FIG. 1, in the case where the inductance of coil 9 has a low value. The signal U of FIG. 3 may also be divided by a divider formed by resistors 44, 45 to supply a low-voltage signal $U_1$, which can be fed to the same electronic circuit as that shown in FIG. 1 so as to supply the three control signals for the converter, namely $f$, $nf$ and $Ex$ respectively appearing at points 18, 31, 51 of the circuit of FIG. 1. However, these three signals are fed to a new circuit 59, which replaces circuits 7 and 15 of FIG. 1. This new circuit employs known logical elements and conventional pulse amplifiers to control the switching of at least one phase of the inverter bridge for each pulse $nf$ or $Ex$, and to supply pulses to each thyristor of the inverter bridge in a manner to obtain the desired output frequency, i.e. in the illustrated example, $f/6$.

Figure 4:
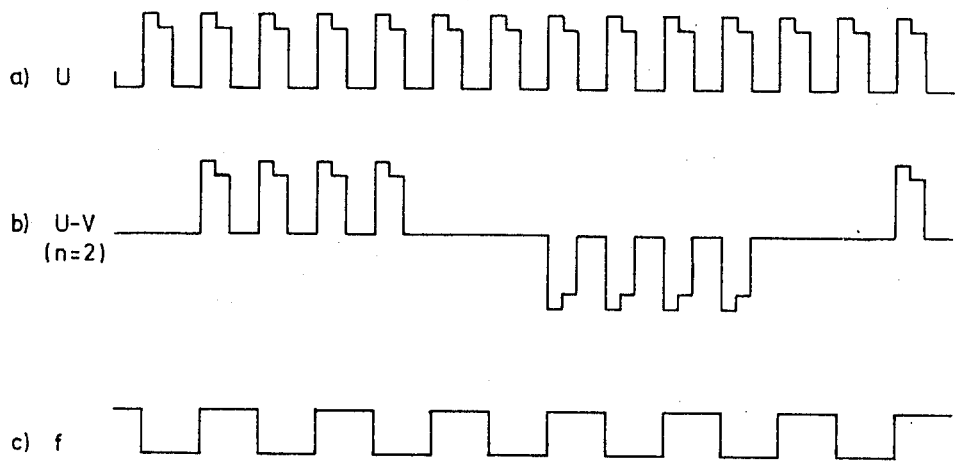
FIG. 4 illustrates the wave-forms of voltages supplied by the inverter of FIG. 3.

FIG. 4 shows the typical appearance of several signals that can be observed with the inverter of FIG. 3 fo the case $n = 2$. The rectified signal U, FIG. 4a, includes 12 voltage pulses per period of the output frequency $f/6$. FIG. 4b shows the form of the output voltage of frequency $f/6$ than can be observed between two phases of the inverter. Finally, FIG. 4c shows the signal $f$ supplied to circuit 59 by the flip-flop 14 of FIG. 1 at its output 18, this signal being necessary to permute control of the thyristors of the inverter bridge so as to provide the output frequency $f/6$.

Of course, the electronic control circuit according to the invention may be provided in several manners different to that shown, by way of example, in FIG. 1. In particular, the number n need not be limited to 1, 2 and 4, but could be any whole number whatsoever. Also, this control circuit may be adapted to any type of polyphase or monophase inverter by using appropriate adaptation circuits.

I claim:

1. Control circuit for an inverter with a variable voltage and output frequency, in which the variation of amplitude of the output voltage is provided by a chopper of the supply voltage, including means of controlling the frequency of the chopper and the output frequency, characterized by the fact that the frequency of the chopper is a multiple of the inverter frequency, the means for controlling the frequency of the chopper being set so as to modify automatically said multiple when the frequency of the chopper leaves a predetermined range.

2. Circuit according to claim 1, characterized by the fact that it includes means for integrating a voltage of the inverter so as to obtain a signal which is an image of the variation of the flux in a motor supplied by the inverter, the output voltage of the inverter being decreased each time this signal reaches a maximum value corresponding to the desired variation of flux, the integrated signal then being reset to zero, the output voltage being periodically increased to a multiple of the frequency of the inverter, means being provided for making a variation of flux inversely proportional to the selected multiple corresponding to said maximum value.

3. Circuit according to claim 1, characterized by the fact that the control of the frequency of the inverter is obtained from a variable-frequency oscillator and means for dividing the oscillator frequency by two, the output frequencies of the oscillator and of the dividing means being selected as the chopper frequency of the supply voltage.

4. Circuit according to claim 2, in which said maximum value of the integrated signal is constant and in which current is supplied to said integrating means via a modifiable resistance, the value of which is inversely proportional to said chosen multiple, and including means for supplying to said modifiable resistance a voltage proportional to the voltage to be integrated.

5. Circuit according to claim 1, comprising a variable-frequency oscillator and means for providing a minimal frequency, and flip-flop means for selecting successive frequencies to periodically retrigger the chopper.

6. Circuit according to claim 5, in which said means for modifying said multiple includes a circuit which delivers a signal when the period of the pulses of the chopper is smaller than a minimal period or greater than a maximum period, said maximum period being slightly greater than twice said minimal period.

7. Circuit according to claim 1, comprising means sensitive to the amplitude of the negative peaks of the d.c. current supplying the inverter after each switching of the phases of the inverter for acting on the inverter output voltage in a manner to reduce said voltage when the amplitude of said negative peaks increases.

8. Circuit according to claim 1, comprising means sensitive to the amplitude of the negative peaks of the d.c. current supplying the inverter after each switching of the phases of the inverter for acting on the switching frequency of the phases of the inverter to momentarily modify the frequency thereof, an increase in the amplitude of said negative peaks momentarily increasing said switching frequency.

* * * * *